United States Patent [19]

Hand

[11] Patent Number: 4,519,634
[45] Date of Patent: May 28, 1985

[54] TRANSITION PIPE FITTING

[76] Inventor: James D. Hand, Rte. #2, Box 29-C, Crestview, Fla. 32536

[21] Appl. No.: 452,315

[22] Filed: Dec. 22, 1982

[51] Int. Cl.³ .............................................. F16L 39/00
[52] U.S. Cl. ..................................... 285/55; 285/139; 285/174; 285/343; 285/351; 285/353
[58] Field of Search ............... 285/174, 138, 139, 349, 285/350, 351, 352, 353, 354, 343, 384, 385

[56] References Cited

U.S. PATENT DOCUMENTS

| 918,843 | 4/1909 | Glidden | 285/334.1 |
|---|---|---|---|
| 1,304,126 | 5/1919 | Venable | 285/343 |
| 1,620,692 | 3/1927 | Rigney | 285/334.3 |
| 2,025,382 | 12/1935 | Fletcher et al. | 285/86 |
| 2,087,920 | 7/1937 | Mascuch | 174/35 SM |
| 2,775,472 | 11/1952 | Brown | 285/343 |
| 2,912,262 | 4/1955 | Franck | 285/343 |
| 3,337,181 | 8/1967 | Wennerstrom | 251/148 |
| 3,576,335 | 4/1971 | Kowal et al. | 285/233 |
| 3,861,719 | 1/1975 | Hand | 285/47 |
| 4,094,536 | 6/1978 | Cole et al. | 285/21 |
| 4,094,537 | 6/1978 | Lyall | 285/47 |
| 4,284,297 | 8/1981 | Godkin | 285/47 |

FOREIGN PATENT DOCUMENTS 2034839  6/1980  United Kingdom ............... 285/353

Primary Examiner—Cornelius J. Husar
Assistant Examiner—Eric K. Nicholson
Attorney, Agent, or Firm—Watson, Cole, Grindle & Watson

[57] ABSTRACT

A pipe fitting for interconnecting concentric pipes together to a gas meter unit includes a standard insulated O-ring union internally modified so as to include therein a substantially frusto-conical recess for mating engagement with a correspondingly shaped neoprene compression seal. The neoprene compression seal is disposed radially inwardly from the O-ring. A steel tube is swaged to a plastic gas conduit pipe and includes a flat washer welded to an upper portion thereof to resist pull out of the steel tube from the pipe fitting assembly.

9 Claims, 4 Drawing Figures

U.S. Patent  May 28, 1985  4,519,634
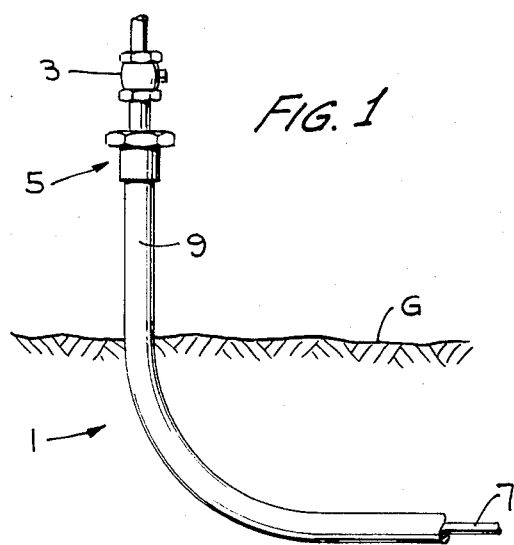
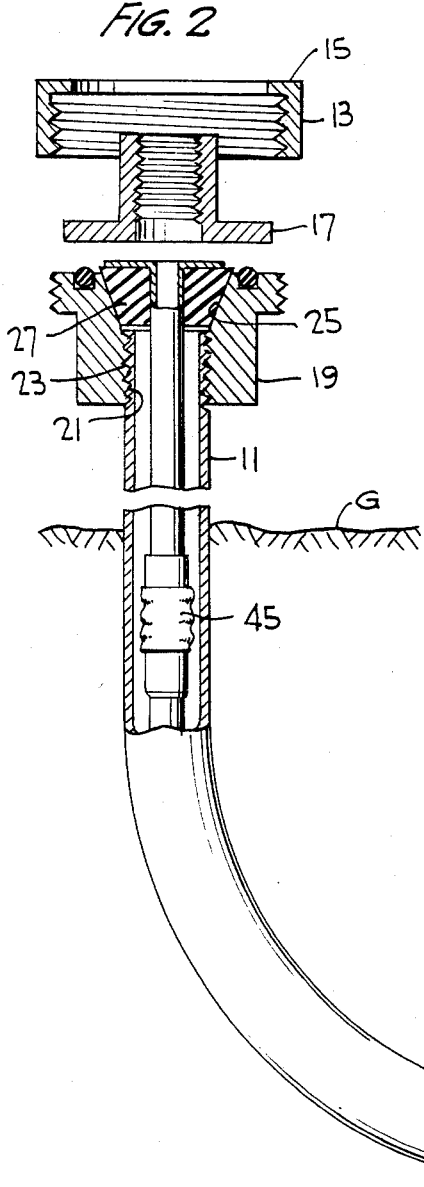
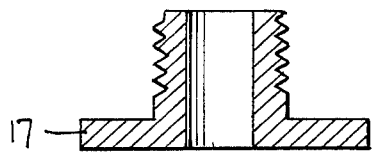
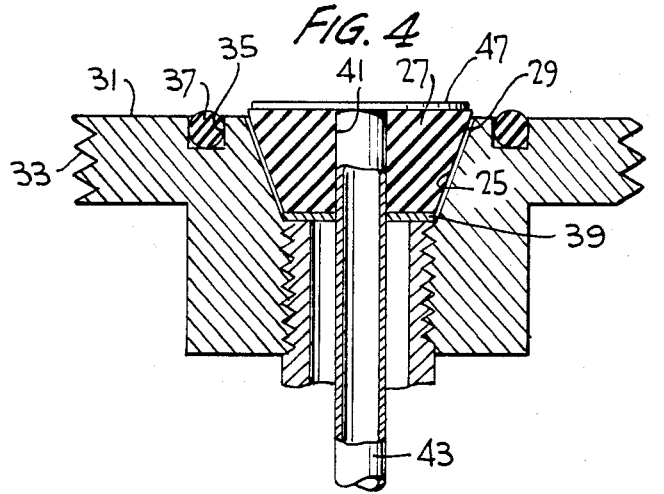

TRANSITION PIPE FITTING

BACKGROUND OF THE INVENTION

1. Field of the Invention

This invention relates generally to pipe fittings and more particularly to a standard sized fitting having a simplified construction for interconnecting concentric pipes together to a gas meter riser unit.

2. Description of the Prior Art

There are in existence today numerous assemblies of components which form pipe joints or couplings for use in pipe assemblies known as anodeless risers. A review of such assemblies reveals relatively complex and concomitant costly assembly configurations. Accordingly, a need has arisen for a simplified transition pipe fitting which reduces the costs of manufacture and production. Such need is accentuated by government regulations which require each natural gas meter to be electrically insulated from adjacent building piping and which require all below ground metal parts of natural gas service lines to be protected against corrosion. Where plastic pipe is used as an underground service line for natural gas, the above ground portion of such line must be protected against deterioration and external damage. Furthermore, such service lines are not to be used for the support of external loads. In addition, service lines inside a building must be protected against external damage, and must be generally insulated against stray electrical currents from the building piping.

U.S. Pat. No. 4,284,297 to Godkin, U.S. Pat. No. 4,094,537 to Lyall, U.S. Pat. No. 4,094,536 to Cole et al and U.S. Pat. No. 3,861,719 to Hand each disclose a meter riser assembly generally directed to the above-mentioned needs, however, such assemblies clearly disclose relatively complicated structures. U.S. Pat. No. 2,087,920 to Maschuch, U.S. Pat. No. 2,025,382 to Fletcher et al, U.S. Pat. No. 1,620,692 to Rigney and U.S. Pat. No. 918,843 to Glidden each disclose a union type fitting wherein one of the main assembly union elements is formed to receive a packing element or seal having a substantially trapozoidal or frustoconical cross section, however, such references disclose only a single packing element or seal and therefore do not provide a back-up or safety seal.

U.S. Pat. No. 3,337,181 to Winnerstrom discloses a pipe fitting including a section having an annular channel formed therein for receiving an O-ring for effecting a single fluid tight seal. Finally, U.S. Pat. No. 3,576,335 to Kowal et al discloses an annular member secured to an end portion of a tube by brazing. Such annular member supports and retains the tube end within the fitting against axial withdrawal.

Thus, there exists a need for a simplified, inexpensive transition pipe fitting which provides at least two gas tight seals and which resists pull out of an inner tube from the point of connection with an outer tube.

SUMMARY OF THE INVENTION

Accordingly, this invention has been made to meet the needs described above. That is, in both new and existing service line constructions, the transition service head pipe fitting of the present invention permits full compliance with the above-mentioned government regulations in a simple, economical and highly effective manner. For existing service lines, metallic piping is usually used as a protective casing for a small diameter plastic pipe located therewithin and interconnecting the gas main with the gas meter unit of a building. In new constructions, the plastic piping is used as the underground conduit and metallic piping of larger diameter is encased thereover for a portion of the length of the conduit extending upwardly beyond ground surface to the gas meter unit.

It is therefore a principle object of the present invention to provide a transition pipe service head fitting for facilitating interconnection of concentric plastic and metallic pipes together to a gas meter unit, wherein a coupling nut is used for sealingly retaining the plastic pipe concentrically within the metallic pipe and wherein a coupling sleeve secures the outer pipe to the nut.

A further object of the invention is to provide a fitting which includes means for insulating the pipe casing from any stray electric current coming from adjacent building piping.

A further object of this invention is to provide a simplified economical transition pipe fitting formed from standard off-the-shelf mass-produced components.

The foregoing and other objects are achieved according to the present invention by the provision of a transition pipe fitting which includes a common insulated O-ring union which is internally modified to receive a compression seal having a generally frusto-conical configuration. A flat washer is secured to an upper end portion of a rigid interior gas carrying tube and arranged between the upper and lower halves of a standard union modified as described below.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views and wherein:

FIG. 1 is an end elevation view showing the portion of a natural gas service line extending upwardly and downstream beyond ground level, the fitting assembly of the invention being installed thereon;

FIG. 2 is a detailed view, partly in section, partly exploded, showing the fitting assembly in accordance with the invention;

FIG. 3 is an elevation view in section of an alternate embodiment of the top half of the union; and FIG. 4 is an enlarged detail view in section showing the lower half of the union.

DETAILED DESCRIPTION OF THE PREFERRED EMBODIMENT

The apparatus developed in accordance with the present invention will now be described in conjunction with the accompanying Figures, within which, for example, a portion of a natural gas pipe line 1 depicted in FIG. 1 is shown lying substantially underground and extending from a gas main (not shown). The pipe line 1 rises out of the level of the ground G and is connected to a standard meter lock wing 3 via transition pipe fitting 5 of the present invention. The meter lock ring 3 is connected to a standard gas meter unit (not shown) affixed to a building.

For new gas pipe installations, a pliant pipe 7 of thermoplastic or thermosetting composition is typically used as the gas conduit extending between the gas main and the pipe fitting 5. The last several feet of gas conduit 7 including its riser portion 9 is encased within a larger diameter pipe 11, typically an anodeless metallic riser having a ¾ inch outer diameter. The outer diameter of gas conduit 7 may be, for example, ⅝ inch and may be formed from polyethelene plastic tubing having a wall thickness of 0.090 inch.

Concentric pipes 7 and 11 are each interconnected with pipe fitting 5 in the manner as shown in FIG. 2. The fitting 5 includes a coupling nut 13 having a radially inwardly directed flange 15 and which, together with the top half 17 and the bottom half 19 of the fitting 5 form an insulated union such as a ¾ inch O-ring type insulated union. Such union may be a standard off-the-shelf assembly subsequently modified as set forth below. The top half 17 of fitting 5 has at least those portions which contact coupling nut 13 and bottom half 19 formed of electrical insulating material to prevent the flow of electric current through fitting 5 to riser pipe 11 to ground level G where it would leave the riser portion 9 thereby causing severe corrosion via electroysis at such point. The bottom half 19 of the fitting 5 acts as a coupling sleeve and includes a threaded bore 21 formed therein for threaded engagement with the threaded end portion 23 of pipe 11. The coupling sleeve 19 of fitting 5 further includes a recess 25 formed therein, preferably having a frusto-conical shape for receiving a rubber compression seal 27 molded so as to fit within the recess 25. The rubber compression seal may be formed of neoprene rubber.

Typically, the top half 17 of fitting 5 includes an internally threaded bore formed therethrough for engaging gas meter lock wing 3 as shown in FIGS. 1 and 2. However, as shown in FIG. 3, top half 17 of fitting 5 may have a smooth bore formed therethrough and include an externally threaded portion for engagement with gas meter lock wing 3.

As shown in detail in FIG. 4, the recess 25 and the compression seal 27 are dimensioned so as to form an annular gap 29 therebetween. In addition, the compression seal 27 is formed so as to protrude slightly above the top surface 31 of coupling sleeve 19 of fitting 5 for a distance approximately equal to the width of the annular gap 29 when in an unassembled, uncompressed state. An annular threaded shoulder 33 is provided on coupling sleeve 19 for threaded engagement with coupling nut 13. An annular channel 35 is formed within the top surface 31 of coupling sleeve 19 radially outwardly from the recess 25 formed therein. An O-ring 37 is provided within the channel 35 and dimensioned so as to protrude, when in an uncompressed state, slightly above the top surface 31 of the coupling sleeve 17 at a distance approximately equal to the distance over which the compression seal 23 protrudes, also when in an uncompressed state, above the top surface 31 of coupling sleeve 19.

A compression washer 39 such as a 7/16 inch S.A.E. flat washer is provided at the bottom of recess 25 for supporting the lower surface portion of compression seal 27. The compression seal 27 further includes an axial bore 41 formed therethrough for receiving a rigid tube 43, formed of, for example, steel. Tube 43 is connected, at a lower portion thereof, to plastic gas conduit 7 and serves as an internal stiffener for the pliant plastic gas conduit and centers conduit 7 within riser 11.

Rigid tube 43 typically extends from the pipe fitting 5 located above ground to a point below ground. Should the portion of the riser above ground be subjected to extreme heat, damage to the plastic gas conduit 7 would thereby be avoided or minimized as tube 43 would shield gas conduit 7 from direct exposure to heat. O-ring 37 is typically formed of neoprene so as to withstand greater heat than gas conduit 7. Tube 43 may have a length of, for example, b 2 feet.

As shown in FIG. 2, tube 43 is coaxially disposed within metallic riser pipe 11 and secured to the plastic gas conduit pipe 7 by a metallic collar 45 swaged so as to compress the gas conduit 7 securely onto tube 43. A flat metallic washer 47 is bonded, such as by welding, to the upper end of tube 43 for contacting the upper surface portion of compression seal 27. The flat metallic washer 47, for example, a 7/16 inch S.A.E. flat washer, serves to prevent the pull out of tube 43 from the compression seal 27.

As further shown in FIG. 2, a moisture seal 49, preferably formed of plastic, is provided at the lower end of riser pipe 11. Threaded grooves are formed in both the moisture seal 49 and the riser pipe 11 for mutual engagement. An O-ring 51 is provided within the moisture seal 49 having an outer diameter approximately equal to that of riser pipe 11 and coacts with an internal shoulder 53 formed within moisture seal 49 to form a compression moisture seal between the lower or upstream end surface of riser pipe 11 and internal shoulder 53.

The moisture seal 49 further includes an annular stepped portion 55 of reduced diameter for coaxially locating plastic conduit pipe 7 within metallic riser pipe 11. O-ring 51 is dimensioned so as to intimately contact the outer diameter of plastic pipe 7 so as to further resist the introduction of moisture into the internal channel or chamber 57 formed between the metallic pipe 11 and the plastic pipe 7. In addition, such assembly seals the rigid tube 43, typically metallic, within a non-corrosive, protected and insulated environment.

A dual gas-tight seal is effected by engaging coupling nut 13 with annular threaded shoulder 33 so as to compress the top half 17 of fitting 5 between the radially inwardly directed peripheral flange 15 of coupling nut 13 and the upper surface of flat metallic washer 47 so as to compress both the compression seal 27 and O-ring 37 thereby effecting such seals. Swage coupling collar 45 provides yet another gas tight seal. Should a gas leak develop at any point inside the riser pipe 11, such leak would be contained by moisture seal 49, O-ring 51, compression seal 27 and O-ring 37. The riser pipe 11 and gas conduit pipe 7 are typically designed to withstand 100 P.S.I. test.

The assembly process is as follows. The riser portion 9 of metallic pipe 11, which is typically a standard ¾ inch service line anodeless riser, is initially formed or prefabricated by bending to a desired shape. Flat metallic washer 47 is welded to one end of steel tube 43. The plastic pipe 7, typically a ⅝ inch plastic tube is then inserted through and beyond the metallic pipe 11 in preparation for making the swage compression connection with swage coupling collar 45. The compression seal 27 is then slid over the lower end of the steel tube 43 up to a position abutting the underside of flat metallic washer 47. The bottom half 19 of fitting 5 is then slid over the steel tube 43 so as to abut the compression seal 27. At this point the compression washer 39 is slid over the steel tube 43.

The swage coupling collar 45, preferably formed of steel, is then slid over the outside of plastic pipe 7 whereupon the bottom end portion of steel tube 43 is inserted, at least to a depth of 4 inches, inside the plastic pipe 7 so as to act as an internal stiffener therefore. A swage coupling is then effected at the joint between the plastic pipe 7 and the steel tube 43 so as to compress the plastic tubing against the outer surface of the steel tube 43 thereby forming a gas tight joint. At this point, the assembly thus far constructed is slid down into the riser portion 9 of the riser pipe 11. That is, plastic pipe or tubing 7 may be inserted into a prefabricated standard gas riser at a job site and a hand operated swaging tool may be used to complete the connection with steel tube 43. The coupling sleeve 19 is then engaged with the threaded upper end portion 23 of metallic pipe 11, thereby pushing compression washer 39 through the threaded bore 21 into abutment with the lower end surface portion of compression seal 27 upon completion of the threaded engagement.

The top half 17 of pipe fitting 5 is then concentrically positioned over the flat metallic washer 47 whereupon coupling nut 13 is threadedly engaged with the annular threaded shoulder 33 of coupling sleeve 19 so as to compress the top half 17 of fitting 5 between the radially inwardly directed peripheral flange 15 provided on coupling nut 13 as well as the flat metallic washer 47, top surface of coupling 17 and the upper surface of O-ring 29. As the top half 17 of fitting 5 is forced downward upon washer 47, the compression seal 27 is expanded outwardly thereby closing annular gap 29 and resulting in intimate gas tight contact between compression seal 27 and recess 25. Upon completion of the threaded engagement between coupling nut 13 and shoulder 33, both O-ring 37 and compression seal 27 will have upper surface portions thereof disposed substantially coplanar with top surface 31 of coupling sleeve 19. In this manner a dual gas tight seal is formed within coupling sleeve 19. That is, a first seal is formed with O-ring 29 while a second seal is formed with compression seal 27 disposed radially inwardly from O-ring 29. Such double seal offers increased protection against gas leaks.

Obviously, numerous modifications and variations of the present invention are made possible in light of the above teachings. It is therefore to be understood that within the scope of the appended claims, the invention may be practiced otherwise than as specifically described herein.

What is claimed as new and desired to be secured by Letters Patent of the United States is:

1. A transition pipe fitting assembly for interconnecting a pliant gas conduit to a gas meter riser having gas flowing therethrough in a downstream direction, wherein said assembly comprises:
   a first half of a standard pipe union serving as a coupling sleeve having an annular threaded shoulder portion extending radially outwardly therefrom, a threaded bore formed therein for threaded engagement with a downstream end portion of said gas meter riser, a recess formed in a downstream surface portion of said coupling sleeve concentric with said threaded bore so as to form a passage through said coupling sleeve, and an annular groove formed in said downstream surface portion of said coupling sleeve radially outwardly from and coaxial with said recess;
   a compression seal disposed within said recess and having an axial channel formed therethrough;
   an O-ring seal disposed within said annular groove;
   a rigid pipe having a downstream end portion thereof inserted within said axial channel formed through said compression seal;
   a flat washer concentrically secured to said downstream end portion of said rigid pipe for resisting withdrawal of said rigid pipe from said axial channel formed through said compression seal such that said flat washer abuts a downstream surface portion of said compression seal;
   a second half of said standard pipe union operatively associated with said coupling sleeve; and
   a coupling nut having threads formed therein and threadedly engaged with said annular threaded shoulder portion of said coupling sleeve to force said second half of said standard pipe union against said flat washer, against said O-ring seal and against said downstream surface portion of said coupling sleeve so as to form a first gas tight seal via compression of said O-ring and to form a second gas tight seal radially inwardly from said first gas tight seal via compression of said compression seal.

2. The assembly of claim 1 further comprising a coupling collar wherein an upstream end portion of said rigid pipe is inserted within a downstream end portion of said pliant gas conduit and intimately secured thereto by swaging said coupling collar over said downstream end portion of said pliant gas conduit.

3. The assembly of claim 2 further comprising:
   a tubular moisture seal threadedly secured at a first end portion thereof to an upstream end portion of said gas meter riser and having a second end portion of reduced diameter securely contacting said pliant gas conduit so as to center said pliant gas conduit within said gas meter riser; and
   an O-ring moisture seal provided between said upstream end surface portion of said gas meter riser and said tubular moisture seal such that said O-ring moisture seal tightly surrounds said pliant gas conduit.

4. The assembly of claim 1 further comprising a compression washer disposed within said coupling sleeve so as to abut an upstream surface portion of said compression seal and to abut said downstream end portion of said gas meter riser.

5. The assembly of claim 1 wherein said second half of said standard pipe union further comprises an internally threaded bore formed therethrough.

6. The assembly of claim 1 wherein said second half of said standard pipe union further comprises an externally threaded pipe section having an annular shoulder extending radially outwardly from an upstream end portion thereof.

7. The assembly of claim 1 wherein said recess formed in said coupling sleeve further comprises a frusto-conical recess and wherein said compression seal further comprises a frusto-conical compression seal having an uncompressed height slightly greater than the depth of said frusto-conical recess.

8. The assembly of claim 7 wherein said O-ring seal and said compression seal each further comprises downstream surface portions substantially coplanar with said downstream surface portion of said coupling sleeve.

9. The assembly of claim 8 wherein said O-ring seal and said compression seal each are formed of neoprene rubber.

* * * * *